United States Patent [19]

Sieber et al.

[11] Patent Number: 5,391,884
[45] Date of Patent: Feb. 21, 1995

[54] BARIUM GADOLINATE PHOSPHOR ACTIVATED BY TERBIUM AND/OR SAMARIUM

[75] Inventors: Kurt D. Sieber, Rochester; Lisa B. Todd, Livonia; Byron R. Sever, Rochester, all of N.Y.

[73] Assignee: Eastman Kodak Company, Rochester, N.Y.

[21] Appl. No.: 65,268

[22] Filed: May 24, 1993

[51] Int. Cl.$^6$ .............................................. C09K 11/78
[52] U.S. Cl. ........................... 250/484.2; 252/301.4 R
[58] Field of Search .................. 250/484.4, 484.2, 581; 252/301.4 R, 301.6 R

[56] References Cited

U.S. PATENT DOCUMENTS

| | | |
|---|---|---|
| 3,842,012 | 10/1974 | Josephus et al. . |
| 3,878,119 | 4/1975 | Nath . |
| 4,261,854 | 4/1981 | Kotera et al. ........................ 250/581 |
| 4,264,677 | 4/1981 | Koyama et al. . |
| 4,783,596 | 11/1988 | Riedner et al. . |
| 4,829,188 | 5/1989 | Shinomiya et al. . |
| 4,857,741 | 8/1989 | Yokota et al. . |
| 4,959,174 | 9/1990 | Nakajima et al. . |

FOREIGN PATENT DOCUMENTS 0202875 11/1986 European Pat. Off. .
0240272 10/1987 European Pat. Off. .

OTHER PUBLICATIONS

"On the Eu$^{3+}$ Flourescence of Mixed Metal Oxides", G. Blasse et al., J. Chem. Phys., vol. 47, No. 7, pp. 2356–2360.

"On the Eu$^{3+}$ Flourescence of Mixed Metal Oxides", G. Blasse et al, Philips Res. Depts. 21, pp. 368–378.

*Primary Examiner*—Paul M. Dzierzynski
*Assistant Examiner*—Richard Henig
*Attorney, Agent, or Firm*—Robert Luke Walker

[57] ABSTRACT

Phosphor compositions are disclosed comprised of a BaGd$_2$O$_4$ host which is activated by at least one of Tb and Sm. These phosphors are useful as storage phosphors. An imaging plate utilizing these phosphors is also disclosed.

25 Claims, 4 Drawing Sheets

BARIUM GADOLINATE PHOSPHOR ACTIVATED BY TERBIUM AND/OR SAMARIUM

FIELD OF THE INVENTION

The present invention relates to storage phosphors which are useful in X-ray imaging plates.

BACKGROUND OF THE INVENTION

Phosphor materials have been used in the past, in a variety of forms, to help in alleviating the exposure of patients to X-rays during X-radiation diagnoses.

Storage phosphors, or photostimulable phosphors, have the ability to store some of the X-ray energy and emit longer wavelength radiation when exposed to (excited by) visible light, infrared rays, heat, etc. The secondary excitation needed to cause the emission of longer wavelength radiation in storage phosphors is commonly referred to as stimulation radiation. Storage phosphors are typically used in imaging plates to acquire images in a digital format and to produce images which may be electronically displayed on a CRT, or printed to a suitable hardcopy medium such as photographic film. Typically, in such imaging plates, the storage phosphors are incorporated into a binder which is applied to a suitable support, such as polyethylene terephthalate (PET), and a protective overcoat material is applied over the phosphor containing binder layer.

When ionizing radiations such as X-rays or Gamma rays are used for imaging human bodies it is desirable that the photostimulable phosphors employed in imaging plates emit light at as high a luminescence intensity as possible due to exposure to stimulating radiation after exposure to ionizing radiation so that the dose of ionizing radiations to which the body must be exposed can be reduced. Of the many different and photostimulable phosphor compositions known, many fail to satisfy the practical demands of medical imaging applications by failing to generate sufficient or photostimulated emission intensity for the desired radiation dose. It is therefore desirable to identify storage phosphors which are capable of producing high photostimulated emission intensities.

It would also be desirable to identify useful phosphor hosts having relatively high densities, since, theoretically, for phosphors which have higher densities, thinner phosphor layers could be utilized, resulting in increased resolution. One very popular storage phosphor, BaFBr, has a relatively low density of about 4.96 g/cc.

Phosphors typically consist of a host compound, which is often combined with a small amount of an activator element to change the hue and/or improve the efficiency of fluorescence.

U.S. Pat. Nos. 4,959,174; 4,829,188; and 4,857,741 disclose phosphors in which gadolinium may be combined with at least one divalent metal selected from the group consisting of Be, Mg, Ca, Sr, Ba, Zn and Cd. However, these phosphors also include either or both of Ta and Nb.

Two articles, "On the $Eu^{3+}$ Fluorescence of Mixed Metal Oxides," by G. Blasse, J. Chem. Phys., Vol. 47, No. 7, pp. 2356–2360 (October 1966); and "On the $Eu^{3+}$ Fluorescence in Mixed metal Oxides," by G. Blasse and A. Bril, Philips Res. Depts. 21, pp. 368–378 (1966), deal with the fluorescence of several gadolinium-containing phosphors, including $BaGd_2O_4$ activated by europium. However, there is no mention of photostimulated luminescence or whether other activating elements result in photostimulable properties for this host compound, nor is there any mention that these phosphors are suitable as storage phosphors.

There continues to be a need for materials which are suitable as storage phosphors, particularly those having higher densities and higher photostimulated emission intensity.

SUMMARY OF THE INVENTION

In accordance with the present invention, a phosphor has been discovered which is capable of absorbing X-radiation and emitting longer wavelength radiation, the phosphor comprising an activated gadolinate host consisting essentially of oxygen and combined elements satisfying the relationship $$BaGd_2:xLn,$$

wherein Ln represents at least one of terbium or samarium activator(s) and x is an amount sufficient to produce a phosphor which exhibits a higher luminescence emission intensity than said phosphor absent the Ln activator when, after first being exposed to X-radiation, the phosphor is stimulated by light of a wavelength ranging from 600 to 1200 nm.

It has surprisingly been discovered that when activated by Sm and/or Tb, $BaGd_2O_4$ acts as a storage phosphor. Particularly preferred $BaGd_2O_4$ storage phosphors are those which are doubly activated by both Tb and Sm.

A method for storing an image produced by X-radiation exposure and releasing the stored image in this storage phosphor is provided, comprising imagewise exposing a storage screen to radiation of a first wavelength, said storage screen comprised of a storage phosphor consisting essentially of oxygen and combined elements satisfying the relationship $$BaGd_2:xLn$$

wherein Ln represents at least one of terbium or samarium activator in an amount sufficient to produce a phosphor exhibiting a higher luminescence intensity than said phosphor absent the Ln activator, thereby storing an image pattern in the storage screen. After the storage screen has been exposed to X-radiation, the storage screen is exposed to radiation of a second wavelength, thereby stimulating the phosphor to emit radiation of a third wavelength. This emitted radiation of the third wavelength is then collected and used to produce an image representative of the image pattern initially stored on the image screen.

In a preferred method of method of making the storage phosphors of the present invention, a mixture containing Ba, Gd, and at least one of Tb and Sm is heated under an atmosphere which is at least partially reducing, thereby reducing at least a portion of the Tb and/or Sm activator(s).

The relatively high density of the $BaGd_2O_4$ lattice (about 7.58 g/cc) results in a relatively high X-ray absorption, which potentially results in high image storage efficiency. In the case of the $BaGd_2O_4$ storage phosphors which are doubly-activated by Sm and Tb, the stimulation band is in the infrared, allowing these materials to be efficiently stimulated with conventional laser diodes or LED's, thereby simplifying scanner design. In addition, the stimulated emission spectra of the storage phosphors of the present invention are located in a region of the visible spectrum where binders do not exhibit appreciable absorption. Consequently, the stimulated emission of these phosphors can be more efficiently collected for imaging.

DETAILED DESCRIPTION OF THE INVENTION

Figure 1:
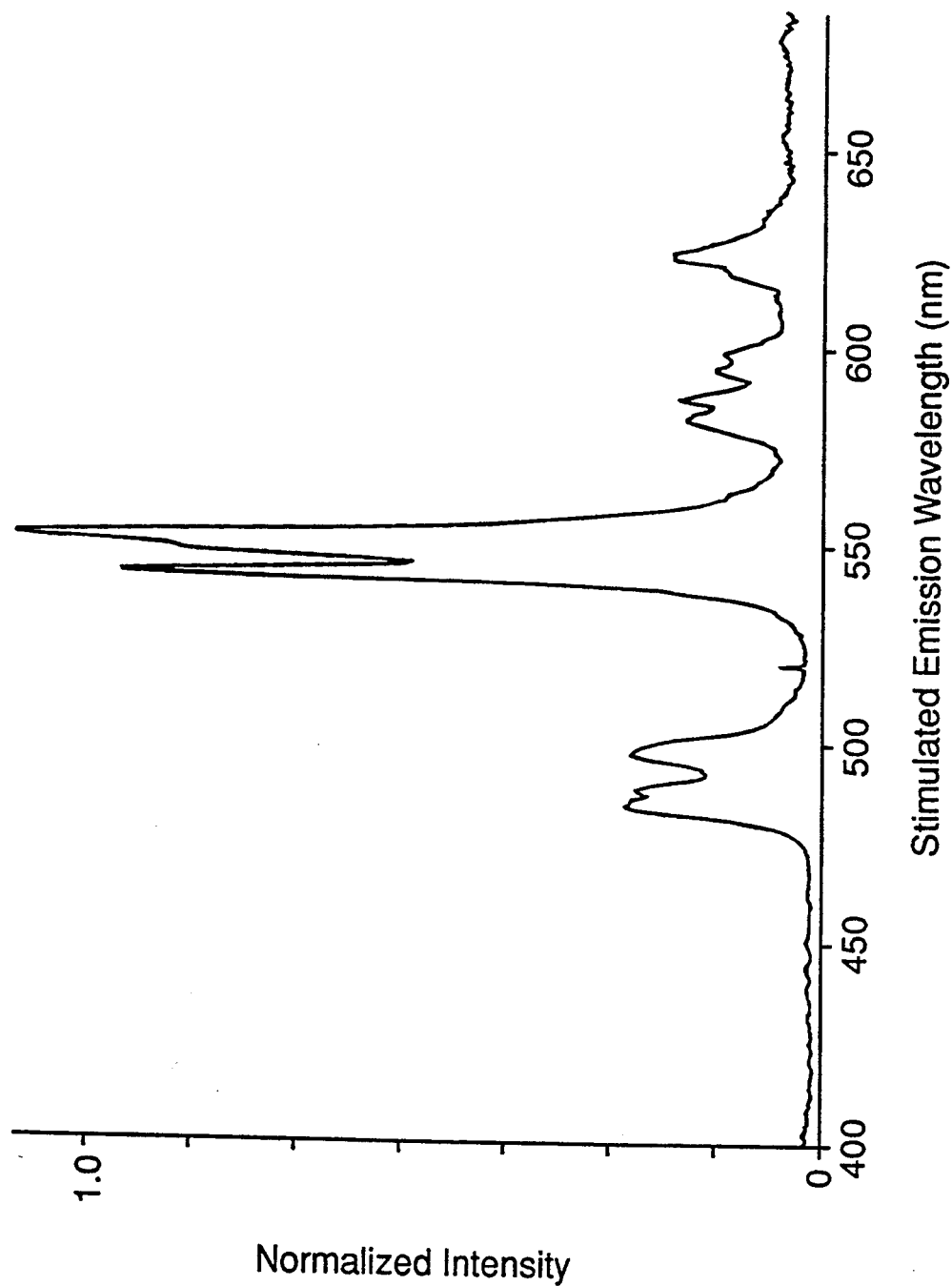
FIG. 1 is a graph illustrating the stimulated emission spectrum (900 nm stimulation) of X-ray excited BaGd$_2$O$_4$ activated by 0.1 mole percent terbium.

In accordance with the present invention, a storage phosphor has been discovered consisting essentially of a BaGd$_2$O$_4$ host activated by terbium and/or samarium. The terbium and/or samarium activator is provided in an amount sufficient to produce a phosphor which exhibits a higher luminescence intensity than the phosphor defined above absent the Ln activator when, after first being exposed to X-radiation, the phosphor is then stimulated by light of a wavelength ranging from 600 to 1200 nm. The storage phosphor of the invention can be represented by the formula:

or can be represented by the formula:

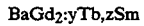

where y is from 0 to 1, z is from 0 to 5, Y+z=x, and x is from $1\times10^{-5}$ to 6.0 in both formulas. The terbium and/or samarium activators are provided, alone or in combination, in the range of from $1\times10^{-5}$ to 6 mole percent of the phosphor.

Preferably, the terbium and/or samarium activators are provided, alone or in combination, in the range of from 0.001 to 6 mole percent of the phosphor. It should be noted that, as discussed herein, each molar quantity of activator replaces an equal moar quantity of gadolinium. When the only activator present is terbium (no samarium), the concentration range is preferably from 0.001 to 1, more preferably from 0.01 to 1, and most preferably about 0.1 mole percent. When the only activator present is samarium (but not terbium), the concentration range is preferably from 0.001 to 5, more preferably 0.01 to 3, and most preferably about 1.0 mole percent.

Preferably, the BaGd$_2$O$_4$ host phosphor is activated by both terbium and samarium. Such doubly activated storage phosphors exhibit photostimulable luminescent properties which are greatly superior to those of either of the singly activated phosphors BaGd$_2$O$_4$:Tb or BaGd$_2$O$_4$:Sm. In fact, the photostimulated emission intensity of doubly activated BaGd$_2$O$_4$:Tb, Sm phosphors was found to typically be an order of magnitude greater than was observed for BaGd$_2$O$_4$ activated by Tb or Sm alone. Consequently, there is an advantage to having both Tb and Sm present.

In a particularly preferred embodiment of the invention, BaGd$_2$O$_4$ is activated by both terbium and samarium such that the terbium and samarium activators are present together in total in a range of from 0.001 to 6.0, more preferably from 0.01 to 4.0, and most preferably from 0.1 to 2.0 mole percent.

When the BaGd$_2$O$_4$ host is activated by both terbium and samarium, the quantity of samarium is preferably greater than the quantity of terbium activator. For example, in a particularly preferred embodiment, the BaGd$_2$O$_4$ host phosphor is activated by about 1.0 mole percent samarium and about 0.1 mole percent terbium. The phosphors of the present invention generally have crystal sizes in the range from about 1 to about 50 microns, with a size range of from about 10 to about 25 microns being preferred.

Methods and techniques commonly used for making phosphors are applicable to the phosphors of the present invention. For example, in a preferred embodiment used to make BaGd$_2$O$_4$:Tb, Sm, a quantity of Sm(NO$_3$)$_3$ 6 H$_2$O is mixed with a quantity of Tb(NO$_3$)$_3$ 6 H$_2$O and Gd$_2$O$_3$. This mixture is then slowly brought (i.e., over a period of several hours) to a temperature between 200° and 1400° C., preferably about 700° C., after which the mixture is calcined for about 1 hour at 700° C. and cooled to room temperature. A quantity of the resultant material is then mixed with a quantity of barium hydroxide, and this mixture is heated to a temperature of between 500° and 1700° C., preferably about 1350° C. for an extended period, such as, for example, about 8 hours. The sample is then reheated for a period of time under a reducing atmosphere, such as, for example, 10% hydrogen/80% nitrogen for 3 hours at 600° C. It is preferred that the phosphors of the present invention be exposed to a reducing atmosphere at some point during fabrication to reduce the activator(s) from a +4 to a +3 oxidation state. Samples that were exposed to a reducing atmosphere during their production exhibited extremely high luminescence emission intensities. X-ray powder diffraction analyses indicate that samples made using this method consist primarily of BaGd$_2$O$_4$:Tb, Sm crystallized in a Eu$_3$O$_4$ type crystal structure.

After the BaGd$_2$O$_4$:Tb, Sm storage phosphors of the present invention have been stimulated by X-radiation, irradiation of these phosphors by radiation of approximately 900 nm will result in these phosphors emitting radiation of a third wavelength. Because this strong stimulation band, which is centered at about 900 nm, is absent from either of the singly activated BaGd$_2$O$_4$ phosphors of the present invention, this stimulation band seems to be a signature of doubly activated BaGd$_2$O$_4$. A stimulation band at 900 nm is advantageous because at this wavelength, laser diodes and IR emitting LED's may be utilized as stimulation sources for these phosphors.

As mentioned above, the density of a material can affect the ability of that material to absorb X-rays. Since luminescent materials used for imaging high energy radiation should preferably be capable of absorbing as much of the incident radiation as possible, it is also preferable that the density of the phosphor be as high as possible. The density of BaGd$_2$O$_4$ is a relatively high 7.58 g/cc, suggesting that the lattice of this phosphor will be a very efficient absorber of incident radiation.

In a preferred embodiment for utilizing the storage phosphors of the present invention, an imaging plate is utilized which consists of a support and a fluorescent layer containing a terbium and samarium activated $BaGd_2O_4$ storage phosphor. The imaging plate is excited by a pattern of radiation of a first wavelength, such as, for example, X-radiation, which has first been transmitted through a human patient. After passing through the patient, the radiation impinges upon the imaging plate and is absorbed by the phosphor layer in proportion to the intensity of the radiation. The phosphor is then exposed to radiation of a second wavelength, causing the storage medium to emit a third wavelength of radiation having an intensity pattern representative of the stored image. This third wavelength of radiation is then efficiently collected by a photomultiplier tube or other collection device having appropriate optics or photoreceptors which respond efficiently to the radiation of the third wavelength. Screens of this type are particularly useful for radiography and other applications in which a pattern of high energy radiation of a first wavelength is absorbed by the phosphor, after which a corresponding pattern of radiation of a second wavelength is released using a suitable method. The method used to release the radiation is not critical, and can be any method known in the art, such as, for example, by scanning the screen with a laser beam that has a wavelength of a second wavelength which is appropriate to cause the phosphor to emit radiation of a third wavelength. The light released from the phosphor due to excitation by the laser is then typically collected by an appropriate photosensor, etc. The signal is then typically amplified, digitized, stored, manipulated using various image processing algorithms, and then displayed on a cathode ray tube or recorded on an image recording medium to form the image.

It should be noted that the initial radiation used to produce the image pattern is not limited to X-radiation and may instead include ultraviolet radiation.

The crystalline phosphors, once formed to satisfy the compositional requirements of the invention, can be employed to form an imaging screen of any otherwise conventional type. In its preferred construction the imaging plate is comprised of a support onto which is coated a fluorescent layer containing the crystalline phosphor in particulate form and a binder for the phosphor particles. The phosphors can be used in the fluorescent layer in any conventional particle size range and distribution. It is generally appreciated that sharper images are realized with smaller mean particle sizes.

It is, of course, recognized that the phosphor particles can be blended with other photostimulable phosphor particles, if desired, to form an imaging plate having optimum properties for a particular application. Imaging plate constructions containing more than one phosphor containing layer are also possible, with a crystalline phosphor of the type described above being present in one or more of the phosphor containing layers.

The photostimulable layer contains sufficient binder to impart structural coherence. The binders employed in the photostimulable layers can be identical to those conventionally employed in fluorescent screens. Such binders are generally chosen from organic polymers which are transparent to X-radiation, stimulating radiation, and photostimulated luminescent radiation, and include, for example, sodium o-sulfobenzaldehyde acetal of poly(vinyl alcohol); chlorosulfonated poly(ethylene); a mixture of macromolecular bisphenol carbonates and poly(alkylene oxides); aqueous ethanol soluble nylons; poly(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in Research Disclosure vol. 154, February 1977, item 15444, and Vol. 182, June 1979. Particularly preferred imaging plate binders are poly(urethanes), such as those which are commercially available under the trademarks Estane (from Goodrich Chemical Co.), Permuthane (from the Permuthane Division of ICI, Ltd.), and Cargill (from Cargill, Inc).

The support onto which the photostimulable layer is coated can be on any conventional type and can be either rigid or flexible. Most commonly, the support is a film support. For highest levels of image sharpness the support is typically black or transparent with black backing and mounted in a cassette for exposure. For the highest attainable speeds a white support, such as a titania or barium sulfate loaded or coated support, is employed.

Any one or combination of conventional intensifying screen features, such as overcoats, subbing layers, and the like, compatible with the features described above can, of course, be employed in photostimulable imaging plates. Both conventional radiographic element and intensifying screen constructions are disclosed in Research Disclosure, Vol. 184, August 1979, Item 18431, the disclosure of which and the patents cited therein are here incorporated by reference. Research Disclosure is published by Kenneth Mason Publications, Ltd., Emswortth, Hampshire PO10 7DD, England.

While the phosphors can be employed for their prompt emission following exposure to X-radiation, they are more preferably employed as storage phosphors that is, for their ability to emit electromagnetic radiation in a chosen wavelength range after being exposed to X-radiation and then stimulated by exposure to radiation in a third spectral region. For example, the phosphors of this invention can be employed in imaging systems of the type disclosed by Luckey U.S. Pat. No. 3,859,527, the disclosure of which is here incorporated by reference. When employed in such a system the refractive incises of the phosphor and binder are preferably approximately matched, as disclosed by DeBoer, et.al. U.S. Pat. No. 4,637,898, also incorporated by reference.

The invention may be more easily comprehended by references to the following specific examples. It must be understood, however, that these examples are provided for purposes of illustration and that the invention may be practiced otherwise than as specifically illustrated without departing from its spirit and scope. For example, the invention is not confined to the particular experimental conditions, reagents, or stoichiometries cited in the examples below. In the examples below compositions are listed in terms of mole percent substitution for $Gd^{3+}$ in the $BaGd_2O_4$ structure.

EXAMPLES

Method of Sample Evaluation

For emission spectra evaluation, samples of the phosphors produced in the following examples were packed into aluminum planchettes (1" in diameter and ¼ deep).

To obtain stimulated emission spectra the packed powder samples were exposed for 1 minute to unfiltered X-radiation from a tungsten target X-ray tube operated at 70 kVp and 30 mA. After a delay of several minutes, the samples were then loaded into a spectrofluorometer, where they were exposed to 900 nm stimulation radiation from a xenon arc lamp which had passed through a monochromator and a Schott RG9 bandpass filter was used as the stimulating radiation. The bandwidth of the stimulating radiation used was 8 nm. The photostimulated emission from each sample was passed through a Corning CS3-75 order-sorting filter and detected by a spectrometer. The spectrometer had previously been calibrated to within 1 nm and had a resolution of approximately 4 nm (full width at half maximum). The intensity calibration of the spectrometer was performed using two NIST-traceable sources and yielded an arbitrary intensity scale proportional to Watts/nm/cm$^2$. The spectra of the photostimulated emission was then corrected for the emission filter transmission and spectrometer sensitivity.

Stimulation spectra were obtained by exposing the samples for 1 minute to unfiltered X-radiation from a tungsten target X-ray tube operated at 70 kVp, 30 mA. After a delay of several minutes each sample was placed in a stimulation apparatus, and subjected to sequential 15 ms long pulses of weak stimulation light. The stimulation radiation used here had a bandpass of 8 nm and was provided by light from a tungsten-halogen lamp which had passed through a monochromator and an order-sorting filter. Stimulation measurements were taken every 10 nm. A Schott RG695 filter was used for stimulation wavelengths shorter than 1200 nm, and a Schott RG850 filter was used for stimulation wavelengths greater than or equal to 1200 nm. The stimulated emission was collected and detected by an Hamamatsu R928 photomultiplier tube after passing through a Corning CS4-96 band pass filter. The spectral correction curve was obtained under these conditions with an NIST-traceable radiometer detector.

All preparations were characterized for phase purity and lattice parameters using X-ray powder diffraction. X-ray powder diffraction patterns were taken using an Enraf Nonius Guinier-DeWolff model 552 camera using Cu k alpha 1 radiation. The resultant photographic film was then digitized using a scanning densitometer. Line positions were corrected using silver as a standard, and lattice constants were calculated using a least squares method.

Comparative Example 1, BaGd$_2$O$_4$

The purpose of this example is to show that the host lattice alone does not exhibit photostimulable luminescence.

BaGd$_2$O$_4$ was prepared by the following procedure: 3.1548 g of barium hydroxide and 3.625 grams of gadolinium oxide were tumbled together in a flask (with no grinding media) for 1 hour. This mixture was then placed into an alumina crucible and heated to 1350° C. for 8 hours. After cooling, the reaction product was removed from the crucible and examined by X-ray powder diffraction. The X-ray powder diffraction showed that the sample consisted essentially of a BaGd$_2$O$_4$ phase with a minor amount of Gd$_2$O$_3$ starting material impurity. The BaGd$_2$O$_4$ phase crystallized with an Eu$_3$O$_4$ structure and could be indexed using an orthorhombic cell having cell constants of a=10.47 Å, b=12.26 Å, and c=3.515 Å.

Under the conditions of our measurements, Example 1 showed photostimulated luminescence. For purposes of comparison with the activated phosphors to be described hereinbelow, the integrated photostimulated luminescence of Comparative Example 1 was given an arbitrary unit value of 1.

Example 1. BaGd$_2$O$_4$:0.1 mole % Tb

The purpose of this example is to show that photostimulable phosphors can be prepared from BaGd$_2$O$_4$ using Tb$^{3+}$ as an activator.

Terbium activated Gd$_2$O$_3$ was prepared by mixing 0.0453 grams of Tb(NO$_3$)$_3$ 6 H$_2$O with 18.1067 grams of Gd$_2$O$_3$. The mixture was brought to 700° C. over a period of 4 hours, then calcined for 1 hour at 700° C., and cooled to room temperature. 3.6250 grams of the resulting Tb-activated Gd$_2$O$_3$ was tumbled together with 3.1548 grams of barium hydroxide for 1 hour, and then placed in an alumina crucible and heated to 1350° C. for 8 hours. The sample was then reheated under a controlled atmosphere of 20% hydrogen/80% nitrogen for 3 hours at 600° C. X-ray powder diffraction of the sample showed that the resultant phosphor material consisted primarily of BaGd$_2$O$_4$:Tb crystallizing with the Eu$_3$O$_4$ structure, along with a small amount of Gd$_2$O$_3$ starting material. The BaGd$_2$O$_4$ phase could be indexed using an orthorhombic unit cell having lattice constants of a=10.48 Å, b=12.26 Å, and c=3.515 Å.

Figure 2:
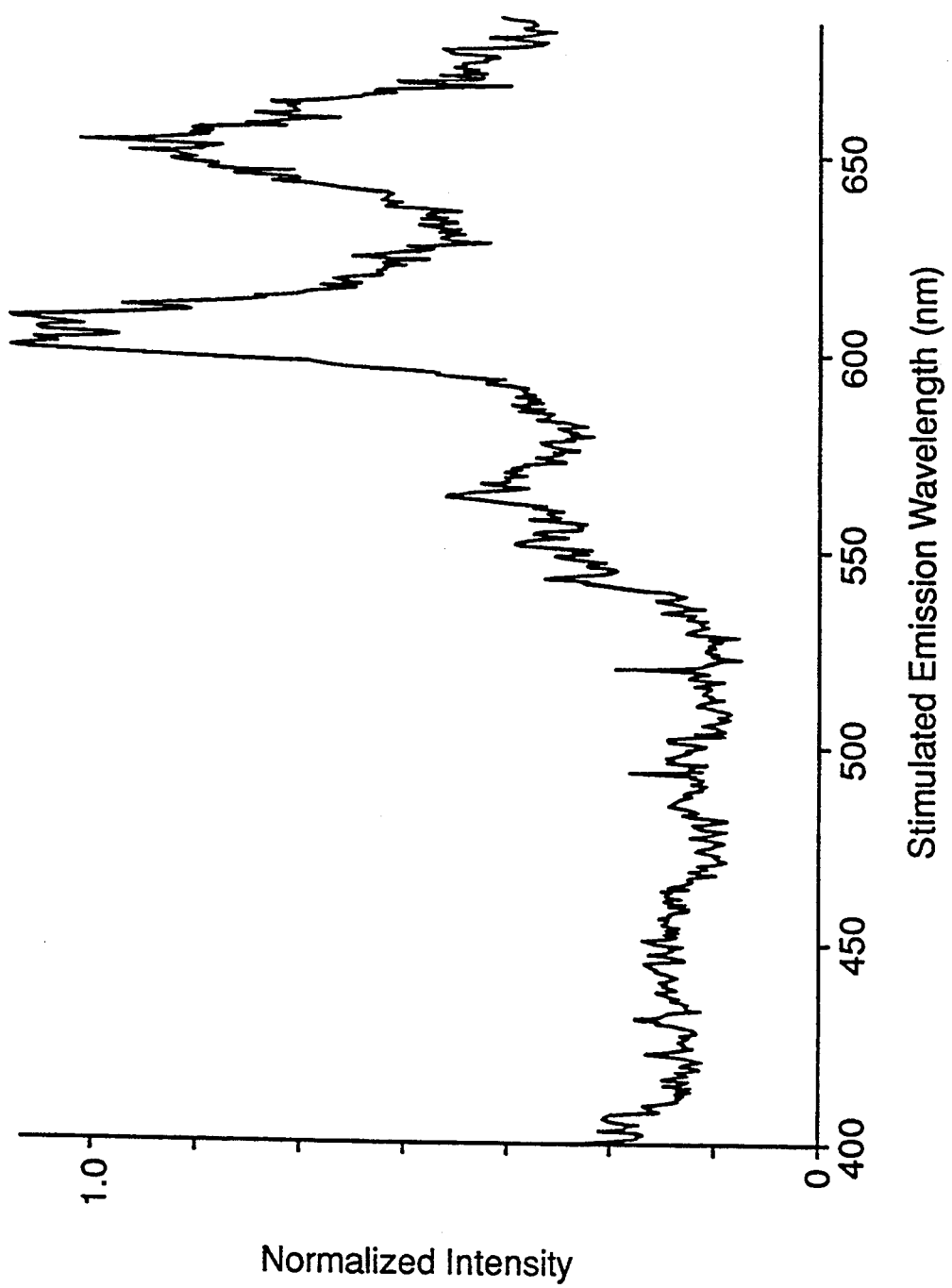
FIG. 2 is a graph illustrating the stimulated emission spectrum (900 nm stimulation) of X-ray excited BaGd$_2$O$_4$ activated by 1.0 mole percent samarium.

The stimulated emission spectrum of BaGd$_2$O$_4$:Tb, shown in FIG. 2, demonstrates that BaGd$_2$O$_4$:Tb is a photostimulable phosphor. The fact that 550 nm is the center of the most intense emission indicates that Tb$^{3+}$ is the emitting center in the stimulated emission for this phosphor. Relative to Comparative Example 1, which was assigned an arbitrary value of 1, the integrated intensity of the photostimulated luminescence of Example 1, as illustrated in FIG. 2, is 3.4 arbitrary units.

Example 2. BaGd$_2$O$_4$:1.0 mole % Sm

The purpose of this example is to show that a photostimulable phosphor can be prepared from BaGd$_2$O$_4$ using Sm$^{3+}$ as an activator.

Samarium activated Gd$_2$O$_3$ was prepared by adding 0.4445 grams of Sm (NO$_3$)$_3$ 6 H$_2$O to 17.9436 grams of Gd$_2$O$_3$. The mixture was brought up to 700° C. from room temperature over a period of about 4 hours, calcined for 1 hour at 700° C., and then cooled to room temperature. 3.6236 grams of the Sm-activated Gd$_2$O$_3$ was mixed with 3.1548 grams of barium hydroxide for 1 hour and then placed in an alumina crucible and heated to 1350° C. for 8 hours. X-ray powder diffraction of the sample showed that the resultant material consisted essentially of BaGd$_2$O$_4$:Sm crystallizing with the Eu$_3$O$_4$ structure along with a small amount of Gd$_2$O$_3$ starting material. The BaGd$_2$O$_4$ phase could be indexed using an orthorhombic unit cell having lattice constants of a=10.48 Å, b=12.26 Å, and c=3.515 Å.

Figure 3:
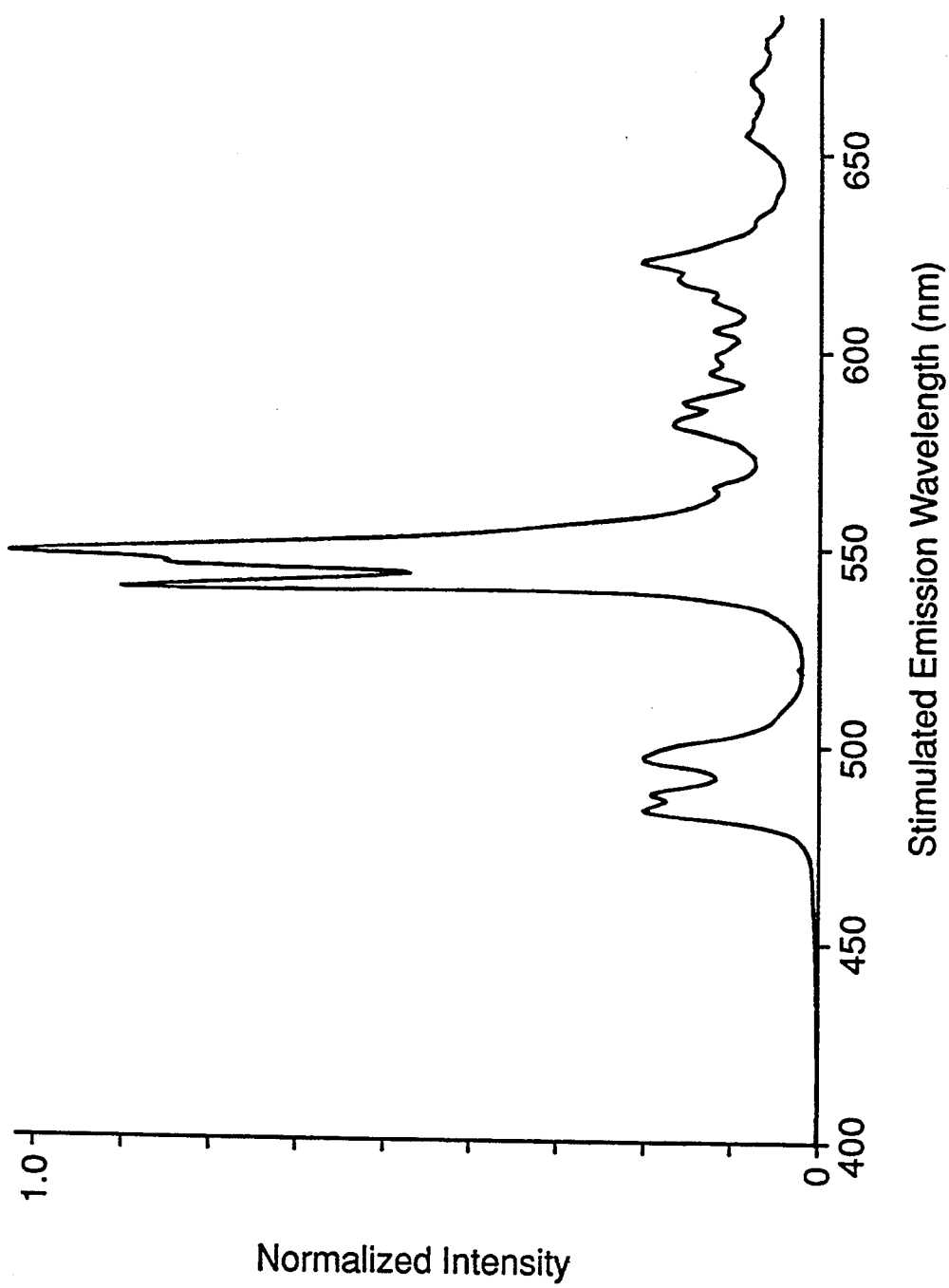
FIG. 3 is a graph illustrating the stimulated emission spectrum (900 nm stimulation) of X-ray excited BaGd$_2$O$_4$ doubly-activated by 0.1 mole percent terbium and 1.0 mole percent samarium.

The stimulated emission spectrum of BaGd$_2$O$_4$:Sm is shown in FIG. 3. Although the intensity of the spectrum is weak, the peak of about 610 nm indicates that Sm$^{3+}$ is the emitting center in the stimulated emission, and that BaGd$_2$O$_4$:Sm shows minimal photostimulable luminescence. Compared to Comparative Example 1, the integrated photostimulable luminescent intensity of Example 2, illustrated in FIG. 3, is about 1.0.

Example 3. BaGd$_2$O$_4$:0.1 mole % Tb, 1.0 mole % Sm

This example describes the preparation of BaGd$_2$O$_4$:Tb, Sm (Sample #BB1384-21C). The purpose of this example is to show that photostimulable phosphors can be prepared from BaGd$_2$O$_4$ using two activators Sm$^{3+}$ and Tb$^{3+}$ and that these phosphors are superior to photostimulable phosphors prepared using only one activator.

0.4445 grams of Sm(NO$_3$)$_3$ 6 H$_2$O was mixed with 0.0453 grams of Tb(NO$_3$)$_3$ 6 H$_2$O and 17.9255 grams of Gd$_2$O$_3$. The mixture was brought to 700° C. over a period of about 4 hours, calcined for 1 hour at 700° C. then cooled to room temperature. 3.6236 grams of the doubly activated Gd$_2$O$_3$ was then mixed with 3.1548 grams of barium hydroxide for 1 hour, after which the mixture was placed in an alumina crucible and heated to 1350° C. for 8 hours. The sample was then reheated under a reducing atmosphere of 10% hydrogen/80% nitrogen for 3 hours at 600° C. X-ray powder diffraction of the sample showed that the material consisted primarily of BaGd$_2$O$_4$:Tb, Sm crystallizing with the Eu$_3$O$_4$ structure along with a small amount of Gd$_2$O$_3$ starting material. The BaGd$_2$O$_4$ phase could be indexed using an orthorhombic unit cell having lattice constants of a=10.47 Å, b=12.26 Å, and c=3.517 Å.

Figure 4:
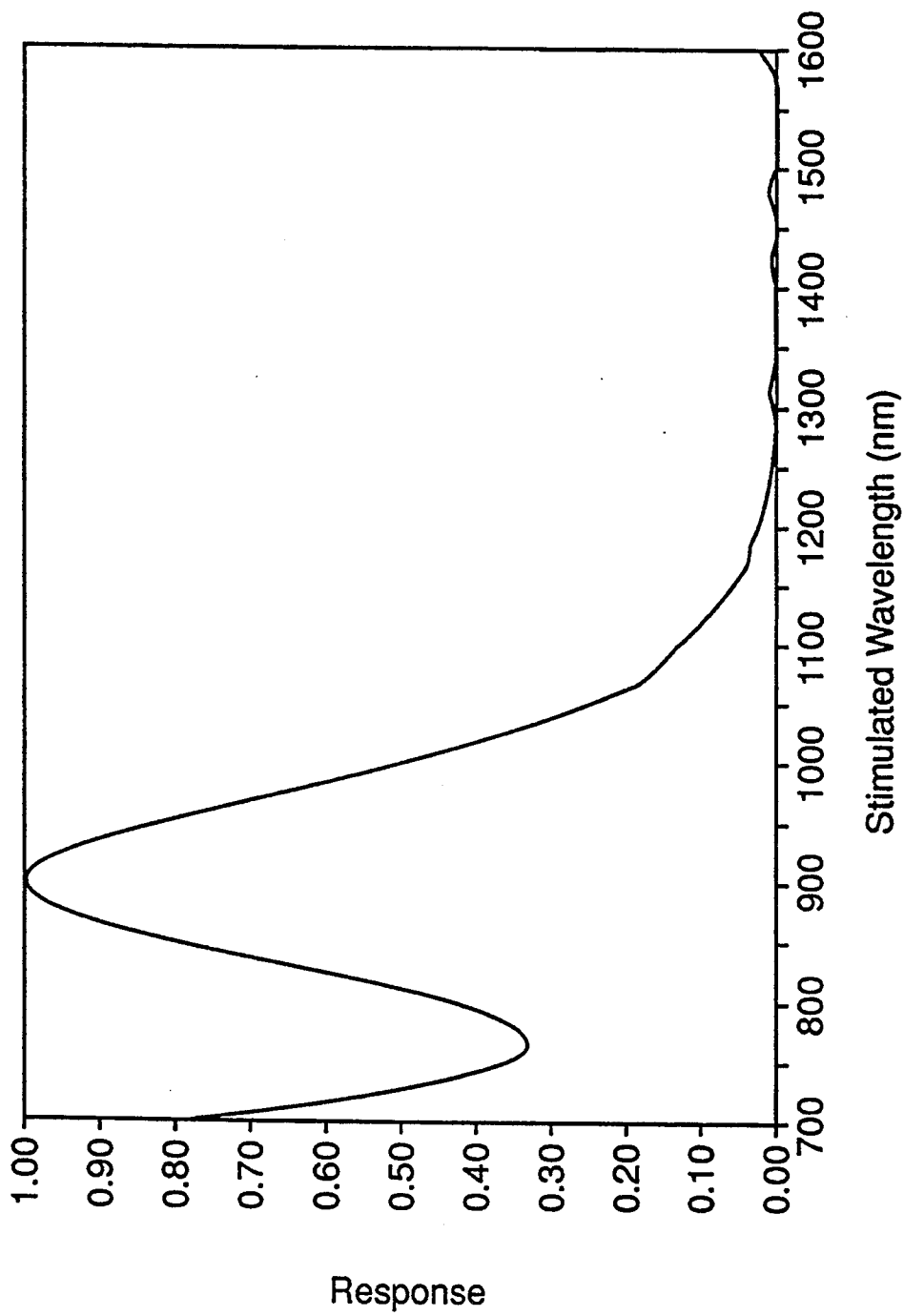
FIG. 4 is a graph illustrating the stimulation spectrum of BaGd$_2$O$_4$ doubly-activated by 0.1 mole percent terbium and 1.0 mole percent samarium, illustrating the characteristic stimulation band centered at about 900 nm.

The stimulated emission spectrum of BaGd$_2$O$_4$:Tb, Sm is shown in FIG. 4. The primary emission is from Tb$^{3+}$, although there is some lower intensity emission from the Sm$^{3+}$ as well. Note that the intensity of the photostimulated emission of the doubly activated BaGd$_2$O$_4$:Tb, Sm phosphor is almost an order of magnitude more intense than the photostimulated emission observed with either Tb$^{3+}$ or Sm$^{3+}$ alone. These results demonstrate the exceptional results obtained using doubly activated BaGd$_2$O$_4$:Tb, Sm phosphors. Compared to Comparative Example 1, the integrated photostimulable luminescence of Example 3, illustrated in FIG. 4, is about 20.6 arbitrary units.

The stimulation response spectrum of BaGd$_2$O$_4$:Tb, Sm, illustrated in FIG. 8, indicates a discrete peak centered around 900 nm. This peak appears to be a signature of the doubly activated phosphor. Because of the enhanced stimulation efficiency of the doubly activated storage phosphor, BaGd$_2$O$_4$:Tb, Sm, at 900 nm, laser diodes and IR emitting LED'S may be utilized as stimulation sources for these phosphors.

Example 4

The purpose of this example is to demonstrate the effect of using a reducing atmosphere in preparing BaGd$_2$O$_4$:Tb, Sm storage phosphors.

For each of examples 5a through 5d, a BaGd$_2$O$_4$ stock phosphor material, doubly activated by 0.1 mole % Tb and 1 mole % Sm, was prepared as follows: 0.0135 g of Tb$_4$O$_7$ and 0.1255 g of Sm$_2$O$_3$ were dissolved in 6 ml of concentrated nitric acid then added to 12.9063 g of Gd$_2$O$_3$ and the mixture evaporated to dryness. The resulting powder was then calcined for 1 hr at 600° C. in air, after which 10.871 g of the powder was mixed with 9.464 g of Ba(OH)$_2$ 8 H$_2$O for 1 hr. This mixture was then heated for 8 hrs in air at 1350° C.

Each of the following examples were conducted in a tube furnace having a quartz muffled tube equipped with gas tight endcaps. All samples were heated in 5 ml high purity alumina crucibles placed at the center of the heating zone of the furnace.

Example 4a 3 grams of the stock material were heated for 2 hours in air at 600° C.

Example 4b 3 grams of the stock material was heated for 2 hours, at 600° C., while argon was allowed to flow into the heating chamber at a rate of 1.5 liters/minute.

Example 4c 3 grams of the stock material was placed in a 5 ml alumina crucible and a loosely fitting carbon lid was placed on top of the crucible. This crucible was, in turn, placed into a larger crucible having a tight fitting lid, with 0.8 grams of carbon (DARCO decolorizing carbon, 20–40 mesh) added into the space between the two crucibles to create a reducing atmosphere. The crucibles and there contents were then heated for 2 hrs, at 600° C., while argon was flowed into the heating chamber at a flow rate of about 1.5 liters/min.

EXAMPLE 4d

The same procedure as that in Example 4c was followed, with the exception that nitrogen was used instead of argon. The nitrogen flow was 1.5 liters/min.

After the above described heating cycles all the powders were removed from the crucibles and tested for photostimulated luminescence. The results are illustrated in Table 1 below. Samples were first exposed to an approximately 10 R dose of unfiltered X-irradiation from a tungsten target, Be window tube operating at 60 kVp and 15 mA. All measurements of photostimulated luminescence were taken at 930 nm, in the wavelength region of highest response in the stimulation spectrum. The illustrated response values at 930 nm represent the relative corrected photostimulated emission signal strengths obtained at 930 nm during the course of the stimulation spectrum measurement. All values are relative to Example 4a, which was given an arbitrary intensity value of 1.

TABLE 1

| Example | Atmosphere | 930 nm Photostimulable Luninescence Response |
| --- | --- | --- |
| 4a | Air | 1 |
| 4bq | Argon | 6.2 |
| 4c | Ar/Carbon | 19 |
| 4d | N2/Carbon | 19 |

Note that the intensity values increased for samples produced using a reducing atmosphere.

Example 5

The purpose of this example is to show that screens of BaGd$_2$O$_4$:Tb, Sm can be prepared and used for imaging ionizing radiation by viewing the photostimulated emission of a screen. A screen of BaGd$_2$O$_4$:Tb, Sm with an inorganic phosphoric acid based binder was prepared according to the procedure described in J Vac Sci. Technology section A, Vol 10, No. 6, November/December, 1992, pages 3595-3596. A sample of phosphor was prepared as described in Example 4c. The substrate used was a quartz plate which was cleaned with a combination of KOH and ethanol to thoroughly degrease the surfaces for coating. The coating was prepared according to the procedure described in the reference given except that 3 mm yttria stabilized zirconia beads and the coating was heated to 200° C. in argon instead of in air. Argon was used to prevent oxidation of the BaGd$_2$O$_4$:Tb, Sm phosphor during curing of the coating. Two screens were fabricated using this method.

The two screens were erased by exposing them to light from a 250 W GE infrared reflector lamp for 3 minutes. A razor blade was set on top of one of the screens and the screens were then exposed to 15 sec X-irradiation from an unfiltered tungsten source operating at 70 kVp, 30 mA. After exposure the photostimulated emission from each of the two screens was evaluated by viewing each screen under infrared light from a 25 W. tungsten lamp filtered through a Corning CS 7-56 filter. The screen which was uniformly X-irradiated showed uniform green colored photostimulated emission over the entire screen area. The screen which had a razor blade placed on top of it showed dark areas which correspond to the regions where the razor blade had blocked the x-ray beam from exposing the phosphor. In addition, details such as holes in the razor blade and different thickness of metal making up the razor blade were clearly visible to the unaided human eye during the viewing of the photostimulated emission under infrared irradiation.

The invention has been described in detail with particular reference to preferred embodiments thereof, but it will be understood that variations and modifications can be effected without departing from the spirit and scope of the invention.

We claim:

1. A phosphor capable of absorbing X-radiation and emitting longer wavelength radiation comprised of an activated ternary gadolinate host consisting essentially of oxygen and combined elements satisfying the relationship BaGd$_2$:xLn wherein
    Ln represents at least one of terbium or samarium activator and x is an amount sufficient to produce a phosphor exhibiting a higher luminescence intensity than said phosphor absent the Ln activator when, after first being exposed to X-radiation, said phosphor is stimulated by light of a wavelength ranging from 600 to 1200 nm.

2. A phosphor according to claim 1, wherein x in the range of from $1 \times 10^{-5}$ to 0.01.

3. A phosphor according to claim 1, wherein said activator consists essentially of both terbium and samarium.

4. A phosphor according to claim 3, wherein Ln comprises about 0.05 to 0.15 mole percent terbium and about 0.5 to 1.5 mole percent samarium.

5. A phosphor according to claim 1, wherein said phsphor further comprises an Eu$_3$O$_4$ crystal structure.

6. A method of storing an image produced by X-radiation exposure and releasing the stored image comprising:
    imagewise exposing to radiation of a first wavelength a storage screen containing a storage phosphor, said phosphor consisting essentially of oxygen and combined elements satisfying the relationship BaGd$_2$:xLn wherein
    Ln represents at least one of terbium or samarium activator and x is an amount sufficient to produce a phosphor exhibiting a higher luminescence intensity than said phosphor absent the Ln activator, thereby storing an image pattern in the storage screen;
    exposing the storage screen to radiation of a second wavelength, thereby stimulating radiation of a third wavelength; and
    collecting the radiation of the third wavelength.

7. A method according to claim 6, wherein the collected radiation of said third wavelength is representative of said image pattern.

8. A method according to claim 6, wherein said second wavelength is in a range of from 600 to 1200 nm.

9. A method according to claim 6, wherein said second wavelength is in a range from 850 to 1150 nm.

10. A method according to claim 6, wherein x is in the range of from $1 \times 10^{-5}$ to 0.05.

11. A method according to claim 6, wherein Ln consists essentially of both terbium and samarium as activators.

12. A method according to claim 6, wherein Ln consists essentially of terbium in the range of from 0.001 to 1 mole percent and samarium in the range of from 0.01 to 5 mole percent.

13. A method according to claim 6, wherein Ln consists essentially of terbium in the range of from 0.05 to 0.15 mole percent and samarium in the range of from 0.5 to 1.5 mole percent.

14. A method according to claim 13, wherein said second wavelength is in the range of from 850 to 1150 nm.

15. A method of making a storage phosphor, comprising:
    providing a mixture containing Ba, Gd, and at least one of Tb and Sm said mixture satisfying the relationship:

BaGd$_2$:yTb,zSm wherein
    y is from 0 to 1,
    z is from 0 to 5,
    Y+z=x, and
    x is from $1 \times 10^{-5}$ to 6.0; and
    heating said mixture under an atmosphere which is at least partially reducing.

16. A method according to claim 15, wherein said heating occurs for a period of time sufficient to convert at least a portion of one of said Tb and Sm from a +4 oxidation state to a +3 oxidation state.

17. A method according to claim 15, further comprising, prior to said heating in a partially reducing atmosphere, heating said mixture in an oxidizing atmosphere at a temperature and for a time period sufficient to convert a at least a portion of said phosphor to a Eu$_3$O$_4$-type crystal structure.

18. A method according to claim 15, wherein said atmosphere comprises at least one gas selected from the group consisting of nitrogen, helium, hydrogen, carbon, argon, krypton, neon, and xenon, carbon monoxide, and carbon dioxide.

19. An X-ray imaging plate comprised of:
    a support; and
    a photostimulable layer containing a binder that is transparent to the photostimulated emission when the layer is excited by X-radiation and stimulated by visible radiation between 600 nm and 1200 nm and photostimulable phosphor crystals capable of absorbing X-radiation, characterized in that the photostimulable phosphor crystals consist essentially of oxygen and a combination of metals satisfying the relationship:

BaGd$_2$:xLn wherein Ln represents at least one of terbium or samarium and x is an amount sufficient to produce a phosphor exhibiting a higher luminescence intensity than said phosphor absent the Ln activator when, after first being exposed to X-radiation, said phosphor is stimulated by light of a wavelength ranging from 600 to 1200 nm.

20. An X-ray imaging plate according to claim 19, wherein Ln represents at least one of terbium or samarium and x is an amount sufficient to produce a phosphor exhibiting a higher luminescence intensity than said phosphor absent the Ln activator when, after first being exposed to X-radiation, said phosphor is stimulated by light of a wavelength ranging from 850 to 1150 nm.

21. A phosphor capable of absorbing X-radiation and emitting longer wavelength radiation comprised of an activated gadolinate host consisting essentially of oxygen and combined elements satisfying the relationship:

BaGd$_2$:yTb,zSm wherein
y is from 0 to 1,
z is from 0 to 5,
y+z=x, and
x is from $2 \times 10^{-5}$ to 6.0,
said phosphor exhibiting a higher luminescence intensity than said phosphor absent Tb and Sm, when after first being exposed to X-radiation, said phosphor is stimulated by light of a wavelength ranging from 600 to 1200 nm.

22. A phosphor as claimed in claim 21 wherein z is 0.
23. A phosphor as claimed in claim 21 wherein y is 0.
24. A phosphor as claimed in claim 21 wherein y is from $1 \times 10^{-5}$ to 1 and z is from $1 \times 10^{-5}$ to 5.
25. A phosphor as claimed in claim 21, wherein y is from 0.05 to 0.15 and z is from 0.5 to 1.5.

* * * * *